(12) United States Patent
Iji

(10) Patent No.: US 7,030,908 B2
(45) Date of Patent: Apr. 18, 2006

(54) METHOD AND CIRCUIT FOR SPOT-KILLER CONTROL IN CATHODE-RAY TUBE

(75) Inventor: Kazuyuki Iji, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 579 days.

(21) Appl. No.: 10/390,606

(22) Filed: Mar. 19, 2003

(65) Prior Publication Data

US 2003/0179295 A1   Sep. 25, 2003

(30) Foreign Application Priority Data

Mar. 20, 2002   (JP) .............................. 2002-078299

(51) Int. Cl.
*H04N 3/20* (2006.01)
*H04N 5/68* (2006.01)

(52) U.S. Cl. ..................... 348/173; 348/377; 348/380; 315/380; 315/381

(58) Field of Classification Search ................ 348/173, 348/377, 380, 379, 730, 615, 617, 634, 805; 315/380, 381, 384, 386, 1
See application file for complete search history.

(56) References Cited

U.S. PATENT DOCUMENTS

| | | | |
|---|---|---|---|
| 3,863,096 A * | 1/1975 | Sennik ........................... 315/1 |
| 4,217,525 A * | 8/1980 | Nakamura et al. .......... 315/381 |
| 5,084,657 A * | 1/1992 | Ueda ........................... 315/381 |
| 5,130,615 A * | 7/1992 | George ........................ 315/381 |
| 5,184,225 A * | 2/1993 | Heidebroek et al. ........ 348/173 |
| 5,677,730 A * | 10/1997 | Park ............................ 348/173 |
| 5,682,083 A * | 10/1997 | Shin ............................... 315/1 |
| 5,714,843 A * | 2/1998 | Youn ............................. 315/1 |
| 5,920,339 A * | 7/1999 | Lee ............................. 348/173 |
| 6,020,693 A * | 2/2000 | Makida ....................... 315/380 |
| 6,046,552 A * | 4/2000 | Yoon ........................... 315/380 |
| 6,211,908 B1 * | 4/2001 | Griepentrog ................ 348/173 |
| 6,242,863 B1 * | 6/2001 | Amaya et al. ................. 315/1 |
| 6,900,830 B1 * | 5/2005 | Okabe ........................ 348/173 |

FOREIGN PATENT DOCUMENTS

| | | |
|---|---|---|
| JP | 5-191753 | 7/1993 |
| JP | 9-266541 | 10/1997 |
| JP | 2000-115538 | 4/2000 |

* cited by examiner

*Primary Examiner*—John Miller
*Assistant Examiner*—Jean W. Désir
(74) *Attorney, Agent, or Firm*—Wenderoth, Lind & Ponack, L.L.P.

(57) ABSTRACT

Disclosed are a method and an apparatus for preventing appearance of a zigzag flush of light in a cathode-ray tube at the time of turning it off. A train of power-off control pulses are produced in synchronization with the vertical sweeping signal; a spot-killer control signal starts in synchronization with a selected power-off pulse to make the whole screen of the cathode-ray tube bright; and the power supply turns off in synchronization with another selected power-off control pulse, so that the power-off is caused at the termination of the vertical sweeping. Thus, the remaining static electricity is discharged at the lowermost of the screen of the cathode-ray tube. To assure that the residual static electricity is discharged completely, the length of time "t1" (continuing for a selected integer as long as the pulse-to-pulse duration) is determined to meet the size of the cathode-ray tube.

4 Claims, 3 Drawing Sheets

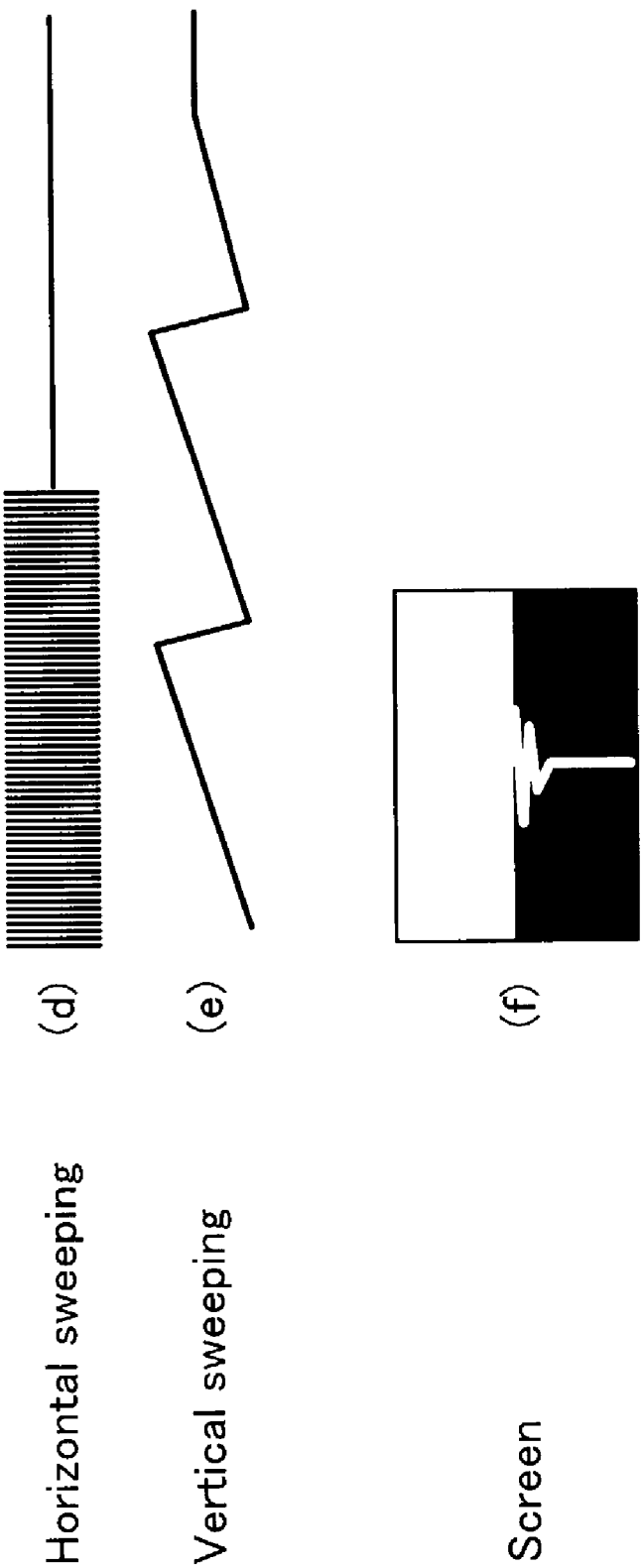

METHOD AND CIRCUIT FOR SPOT-KILLER CONTROL IN CATHODE-RAY TUBE

BACKGROUND OF THE INVENTION

1. Field of the Invention

The present invention relates to a method and a circuit for spot-killer control in a cathode-ray tube, more particularly to a method and a circuit for preventing appearance of a zigzag flush of light in a cathode-ray tube at the time of turning it off.

2. Related Art

A television picture tube or cathode-ray tube is equipped with an electron gun, comprising a hot cathode which emits electrons. These are concentrated into a beam which is moved to and fro by a deflecting means and appears as a spot of light on a fluorescent screen. The scanning spot of the electron beam moves to and fro across the screen, line by line. When the cathode-ray tube turns off, it may happen that an intense zigzag flush of light appears in the screen. This is caused by the discharging of remaining static electricity subsequent to the turning-off of the cathode-ray tube. As seen from FIG. 3, when the screen is flooded with electrons, the horizontal scanning happens to stop on the way to the lowermost of the screen by turning the power supply off. Then, the remaining static electricity is allowed to flow to the ground. As a result an intense zigzag flush of light appears in the screen. This lowers the "turning-off" quality, giving unpleasing impression to televiewers.

More specifically, assuming that the horizontal sweeping is made to stop (see FIG. 3(d)) when the vertical sweeping is on the halfway to the lowermost position of the screen (see FIG. 3(e)). The horizontal sweeping signal decays to stop scanning. The vertical sweeping decays to stop later than the horizontal sweeping. As a result, the upper half of the screen shines white, and the lower half turns dark (see FIG. 3(f)). Then, a zigzag flush of light appears in the lower half of the screen.

In the hope of improving the "turning-off" quality JP 2000-115568A, titled "Cathode-ray Tube Display and Method of Turning It Off" proposed that: the time at which the vertical sweeping signal ends is detected subsequent to appearance of the power-off signal; and a ramp signal generator is responsive to the signal representing the so detected termination of the saw-tooth signal for providing an extra high-voltage signal, which falls to zero voltage immediately after its appearance, thus expanding the vertical sweeping beyond the lowermost of the screen, where the spot killer circuit is allowed to discharge the residual storage electricity, thus preventing appearance of the zigzag flush of light in the screen.

JP 9-266541A, titled "Television Receiver" proposed that: the cathode-ray tube is responsive to appearance of the power-off signal to shine white all over the screen for a short while (approximately 20 milliseconds); and then the cathode-ray tube is supplied with the beam current, thereby allowing the residual static electricity to flow to the ground via the CRT drive circuit.

JP 5-191753A, titled "Power-Supply Circuit for a Television Receiver" proposed that: synchronous signals are produced in synchronization with the vertical sweeping; in response to appearance of the power-off signal a decision is made as to whether or not a synchronous signal appears; and in the affirmative case the electric power supply is made to turn off in synchronization with the synchronous signal, and hence with the vertical sweeping, thereby guaranteeing the quality of power-off.

These conventional devices, however, cannot completely prevent the zigzag flush of light from appearing in a cathode-ray tube at the time of turning it off.

One object of the present invention is to provide a method and a circuit for completely preventing appearance of a zigzag flush of light in a cathode-ray tube at the time of turning it off.

SUMMARY OF THE INVENTION

To attain this object according to the present invention a method for preventing appearance of a zigzag flush of light in a cathode-ray tube at the time of turning it off, comprising the steps of: providing a train of power-off control pulses in synchronization with the vertical sweeping signal; starting a spot-killer control signal in synchronization with a selected power-off pulse to make the whole screen bright; and putting the power supply off in synchronization with another selected power-off pulse, so that the power-off is caused at the termination of the vertical sweeping, thus allowing the remaining static electricity to be discharged at the lowermost of the screen of the cathode-ray tube.

The first and subsequent selected power-off pulses may be separate from each other by a selected integer as long as the pulse-to-pulse duration, long enough to allow the remaining electricity to be discharged completely.

Another object of the present invention is to provide a spot-killer control circuit for completely preventing appearance of a zigzag flush of light in a cathode-ray tube at the time of turning it off.

To attain this object according to the present invention a spot-killer control circuit in a cathode-ray tube comprising: a power-off control pulse generator for providing a train of power-off control pulses in synchronization with the vertical sweeping signal; a spot-killer control signal generator for applying to the electron gun of the cathode-ray tube a voltage signal high enough to make the whole screen of the cathode-ray tube bright; control means for applying to the electron tube a spot-killer control signal in synchronization with a selected power-off pulse to make the whole screen bright, and for turning the power supply off in synchronization with another selected power-off pulse, so that the power-off is caused at the termination of the vertical sweeping, thus allowing the remaining static electricity to be discharged at the lowermost of the screen of the cathode-ray tube.

The control means includes means for selecting the another power-off control signal as being separate from the first power-off control pulse by a selected integer as long as the pulse-to-pulse duration, long enough to allow the remaining static electricity to be discharged completely.

Other objects and advantages of the present invention will be understood from the following description of some preferred embodiments of the present invention, which are shown in accompanying drawings.

BRIEF DESCRIPTION OF THE DRAWING

FIG. 3 shows how a zigzag flush of light appears in a cathode-ray tube at the time of turning it off.

DETAILED DESCRIPTION OF PREFERRED EMBODIMENT

Referring to FIG. 3(f) again, to assure that no zigzag flush of light appears in the screen, the stop of the horizontal sweeping is timed to be simultaneous with the end of the vertical sweeping, thereby pulling down the zigzag flush of light to the lowermost of the screen, thus putting it out of sight.

Figure 1:
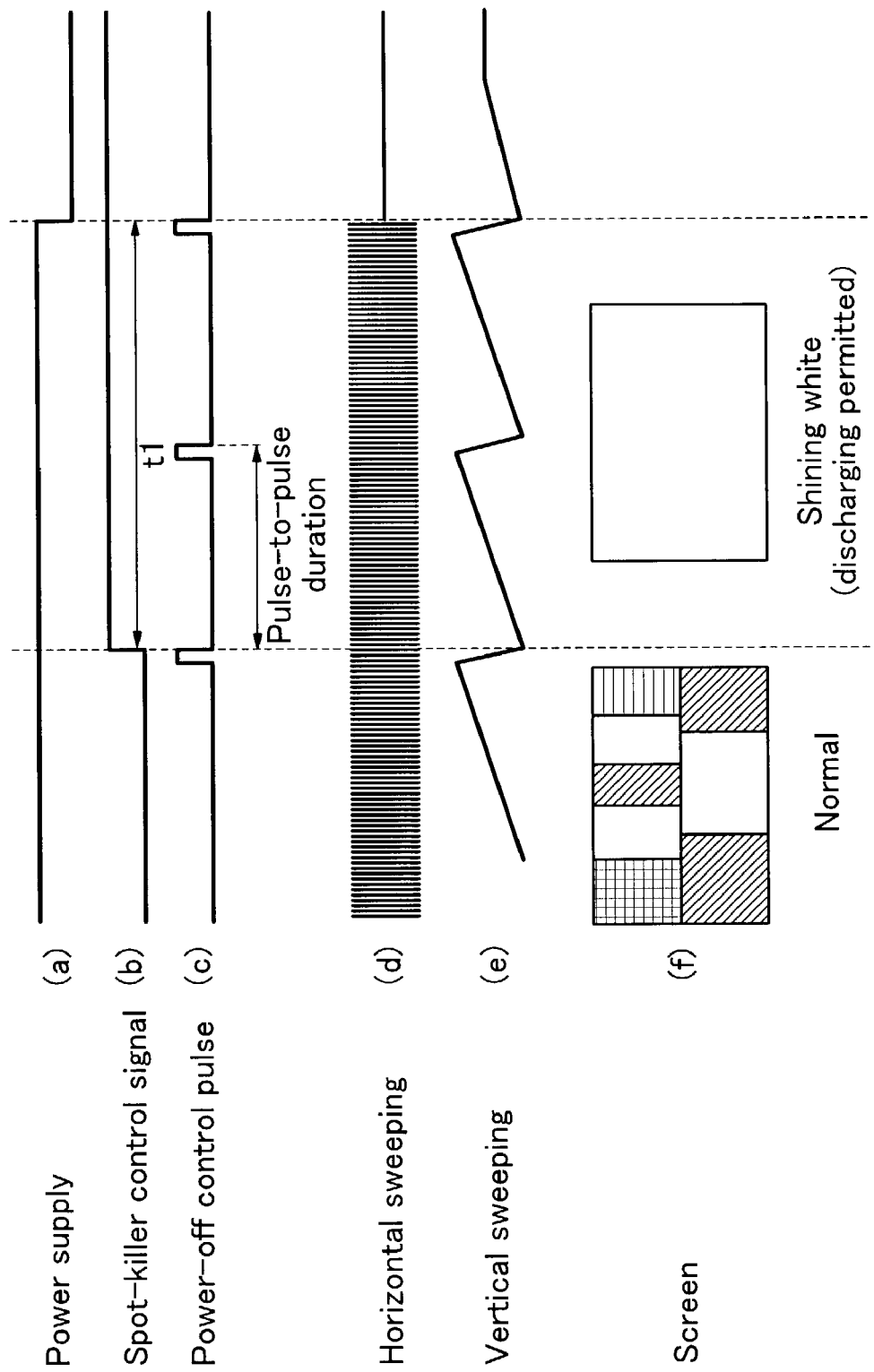
FIG. 1 shows how a zigzag flush of light can be prevented from appearing in a cathode-ray tube at the time of turning it off according to the present invention.

Referring to FIG. 1, a train of power-off control pulses (FIG. 1(c)) is produced in synchronization with the vertical sweeping signal (FIG. 1(e)). A spot-killer control signal (FIG. 1(b)) starts in synchronization with a selected power-off pulse to make the whole screen shine white (see FIG. 1(f)). The power supply turns off in synchronization with another selected power-off control pulse (see FIG. 1(a)), so that the power-off is caused at the termination of the vertical sweeping, thus allowing the remaining static electricity to be discharged at the lowermost of the screen of the cathode-ray tube.

The quantity of the residual static electricity increases with the size of the cathode-ray tube, and accordingly the length of period "t1" involved for discharging increases. To assure that the residual static electricity is discharged completely, the length of time "t1" (continuing for a selected integer as long as the pulse-to-pulse duration) is extended to meet the size of the cathode-ray tube. The length of time "t1" continues for a selected integer as long as the pulse-to-pulse duration (16 milliseconds long).

Figure 2:
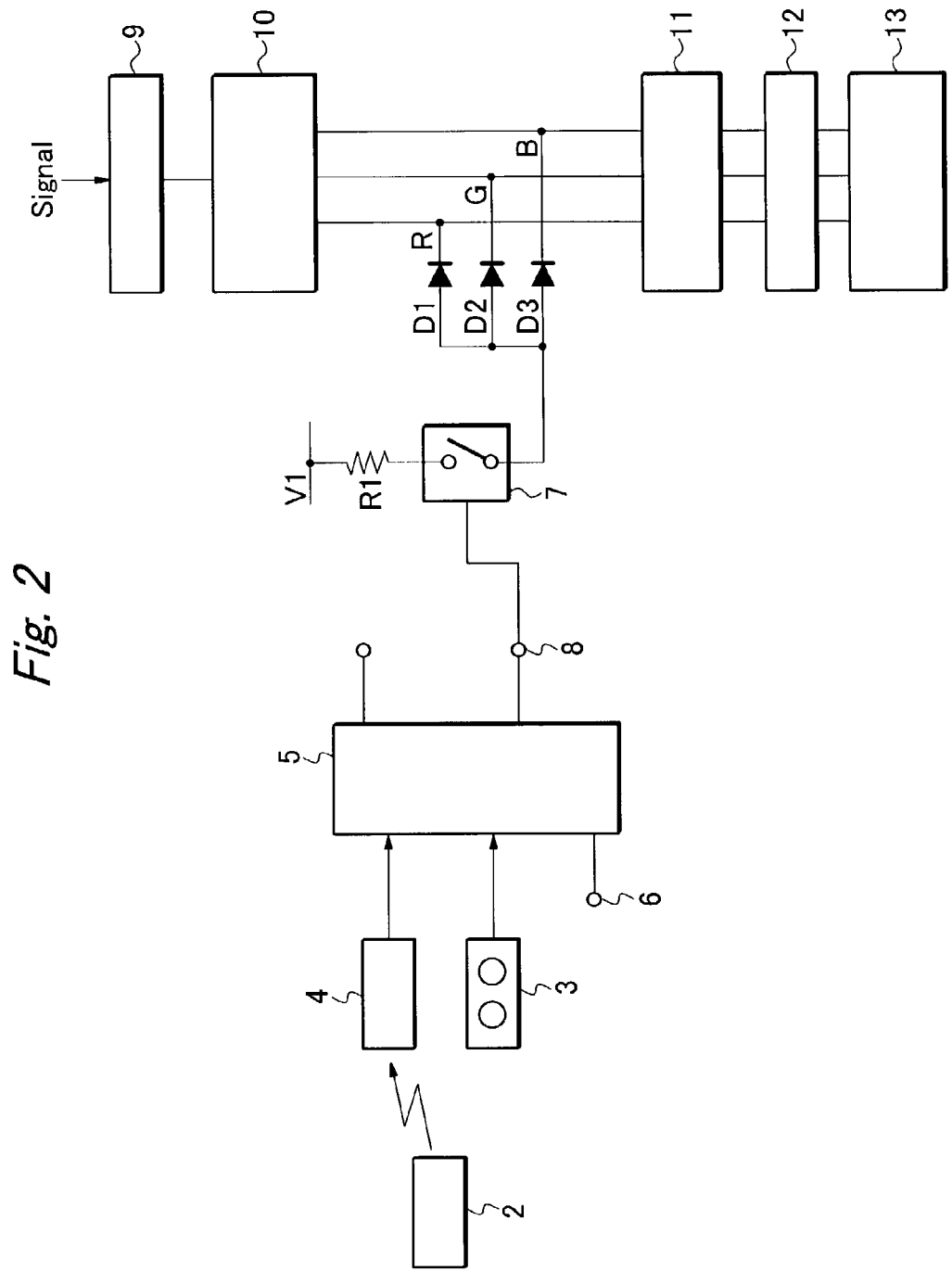
FIG. 2 shows a block diagram of the part of a television receiver incorporating a spot-killer control circuit according to the present invention.

FIG. 2 shows the part of a television receiver incorporating a spot-killer control circuit modified according to the present invention. In the drawing a remote control transmitter is indicated by 2; power-off button on the console of a television receiver by 3; receiver for receiving control signals from the remote control transmitter by 4; micro-computer by 5; terminal to which power-off control pulses are applied by 6; exterior switching unit by 7; terminal at which spot-killer control signals appear by 8; tuner by 9; chromatic IC for providing R, G and B signals by 10; chromatic signal amplifier by 11; electron gun by 12; and cathode-ray tube by 13.

The exterior switching unit 7 is normally closed, and is responsive to the rise of the spot killer signal for turning on.

In operation the remote control transmitter 2 sends a power-off signal to the receiver 4, or the power-off button 3 on the console of the television receiver is depressed. Then, the micro-computer 5 permits a spot-killer control signal (FIG. 1(c)) to apply to the exterior switching unit 7 for closing in synchronism with a selected power-off control pulse. Then, a predetermined fixed voltage V1 is applied to the chromatic signal amplifier 11 via the resistor R1, the closed switch 7, and the diodes D1, D2 and D3. The amplified voltage is applied to the electron gun 12 so that the whole screen of the cathode-ray tube 13 may shine white.

The power supply is made to cease subsequent to the termination of the length of period "t1" (see FIG. 1(a)). The length of period "t1" (equal to a selected integer as long as the pulse-to-pulse duration) depends on the cathode-ray tube, particularly the discharging characteristics thereof, and it can be set appropriately in the microcomputer 5.

What is claimed is:

1. Method for preventing appearance of a zigzag flush of light in a cathode-ray tube at a time of turning it off, comprising the steps of:
   providing a train of power-off control pulses in synchronization with a vertical sweeping signal;
   starting a spot-killer control signal in synchronization with a selected power-off pulse to make the whole screen of the cathode-ray tube bright; and
   putting a power supply off in synchronization with another selected power-off control pulse, so that the power-off is caused at termination of the vertical sweeping, thus allowing remaining static electricity to be discharged at the lowermost of the screen of the cathode-ray tube.

2. Method according to claim 1, wherein the first and subsequent selected power-off pulses are separate from each other by a selected integer as long as the pulse-to-pulse duration, long enough to allow the remaining static electricity to be discharged completely.

3. A spot-killer control circuit in a cathode-ray tube comprising:
   a power-off control pulse generator for providing a train of power-off control pulses in synchronization with a vertical sweeping signal;
   a spot-killer control signal generator for applying to an electron gun of the cathode-ray tube a voltage signal high enough to make the whole screen of the cathode-ray tube bright;
   control means for applying to the electron tube a spot-killer control signal in synchronization with a selected power-off control pulse to make the whole screen bright, and for turning the power supply off in synchronization with another selected power-off control pulse, so that the power-off is caused at the termination of the vertical sweeping, thus allowing the remaining static electricity to be discharged at the lowermost of the screen of the cathode-ray tube.

4. A spot-killer control circuit in a cathode-ray tube according to claim 3, wherein the control means includes means for selecting the another power-off control signal as being separate from the first power-off control pulse by a selected integer as long as the pulse-to-pulse duration, long enough to allow the remaining static electricity to be discharged completely.

* * * * *